Patented Feb. 12, 1935

1,990,609

UNITED STATES PATENT OFFICE 1,990,609

PROCESS OF VULCANIZING RUBBER

Helmuth Meis, Leverkusen-Wiesdorf, Germany, assignor to I. G. Farbenindustrie Aktiengesellschaft, Frankfort-on-the Main, Germany No Drawing. Application September 1, 1933, Serial No. 687,916. In Germany September 9, 1932

8 Claims. (Cl. 18—53)

The present invention relates to a process of vulcanizing rubber and to new vulcanization accelerators being applied in said process.

In accordance with the invention there are applied as vulcanization accelerators compounds of the probable formula:—

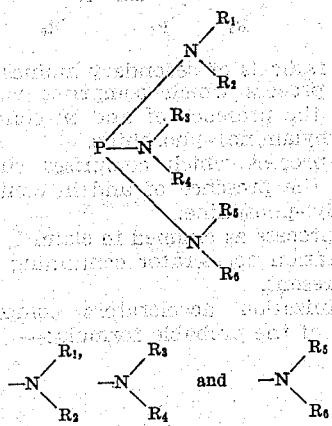

wherein $$-N\diagdown\begin{smallmatrix}R_1\\R_2\end{smallmatrix} \quad -N\diagdown\begin{smallmatrix}R_3\\R_4\end{smallmatrix} \text{ and } -N\diagdown\begin{smallmatrix}R_5\\R_6\end{smallmatrix}$$

stand for radicals of secondary amines, $R_1$ to $R_6$ meaning substituted or unsubstituted hydrocarbon groups, such as alkyl groups, aryl groups, aralkyl groups, hydroaryl groups, etc., $R_1$ and $R_2$, $R_3$ and $R_4$, $R_5$ and $R_6$ may also stand for a chain of alkylene groups, which may be interrupted by hetero atoms, such as sulfur or oxygen. The main advantages of these new accelerators are that they do not tend to scorching and that they possess a wide curing range (plateau effect). They may be used alone or, preferably, in admixture with other accelerators, more particularly, accelerators containing sulfur, such as mercaptoarylene thiazoles, thiuram mono- or disulfides, additional products of carbon disulfide to the compounds of the formula given above, which accelerators are strongly activated by the accelerators herein disclosed.

The new accelerators can be prepared, for example, by reacting upon phosphorous trichloride with any desired secondary amine, such as dimethylamine, diethylamine, pipecoline, etc.

Instead of the free accelerators, salts thereof with suitable acids, more particularly, high molecular fatty acids, such as stearic acid, oleic acid etc. may be applied.

The following examples illustrate the invention, without limiting it thereto, the parts being by weight:—

Example 1

A vulcanization mixture was prepared from:—

|  | Parts |
|---|---|
| Light crepe | 50 |
| Smoked sheets | 50 |
| Zinc white | 5 |
| Heavy spar (finely ground) | 10 |
| Sulfur | 3.5 |
| Tri-(dimethylamino)-phosphine | 1.0 |

When vulcanizing this mixture the following figures were obtained:—

| Heating 3 atmospheres superatmospheric | Tensile strength in kg/cm² | Stretch in percent |
|---|---|---|
| Minutes | | |
| 45 | 121 | 950 |
| 60 | 127 | 907 |
| 80 | 136 | 880 |
| 100 | 136 | 850 |

When substituting the accelerator of the above example by the same quantity of tripiperidylphosphine, the following figures were obtained:—

| Heating 3 atmospheres superatmospheric | Tensile strength in kg/cm² | Stretch in percent |
|---|---|---|
| Minutes | | |
| 45 | 127 | 915 |
| 60 | 158 | 915 |
| 80 | 155 | 875 |
| 100 | 152 | 851 |

Example 2

A vulcanization mixture was prepared consisting of:—

|  | Parts |
|---|---|
| Light crepe | 50 |
| Smoked sheets | 50 |
| Zinc white | 5 |
| Titan dioxide | 15 |
| Heavy spar (finely ground) | 10 |
| Sulfur | 3.5 |
| Stearic acid | 1 |
| 2-mercaptobenzothiazole | 0.45 |
| Tri-(dimethylamino)-phosphine | 0.45 |

When vulcanizing this mixture, the following figures were obtained:—

| Heating 0.5 atmosphere superatmospheric | Tensile strength in kg/cm² | Stretch in percent |
|---|---|---|
| *Minutes* | | |
| 30 | 140 | 936 |
| 50 | 189 | 848 |
| 80 | 223 | 790 |
| 120 | 210 | 753 |
| 1.5 atmospheres superatmospheric | | |
| *Minutes* | | |
| 15 | 155 | 860 |
| 25 | 208 | 832 |
| 40 | 217 | 805 |
| 60 | 224 | 784 |
| 80 | 223 | 770 |

When applying in the above mixture instead of the tri-(dimethylamino)-phosphine, the corresponding stearate, the following figures were obtained:—

| Heating 0.5 atmosphere superatmospheric | Tensile strength in kg/cm² | Stretch in percent |
|---|---|---|
| *Minutes* | | |
| 30 | 144 | 915 |
| 50 | 198 | 843 |
| 80 | 236 | 792 |
| 120 | 251 | 788 |
| 1.5 atmospheres superatmospheric | | |
| *Minutes* | | |
| 15 | 167 | 869 |
| 25 | 202 | 823 |
| 40 | 229 | 816 |
| 60 | 229 | 784 |
| 80 | 219 | 764 |

When applying instead of the tri-(dimethylamino)-phosphine 0,45 part of tri-piperidyl-phosphine, the following figures were obtained:—

| Heating 0.5 atmosphere superatmospheric | Tensile strength in kg/cm² | Stretch in percent |
|---|---|---|
| *Minutes* | | |
| 30 | 130 | 894 |
| 50 | 192 | 840 |
| 80 | 228 | 774 |
| 120 | 219 | 740 |
| 1.5 atmospheres superatmospheric | | |
| *Minutes* | | |
| 15 | 158 | 843 |
| 25 | 217 | 834 |
| 40 | 226 | 800 |
| 60 | 235 | 776 |
| 80 | 237 | 773 |

In the above examples the accelerators mentioned may be replaced, for example, by mono-piperidyl-di-(diethylamino)-phosphine, monopiperidyl-di-(ethylmethylamino)-phosphine, tri-pipecolylphosphine, tri-(para-nitro-N-methylphenylamino)-phosphine etc.

Likewise, in the above examples the natural rubber may be partly or totally replaced by artificial rubber-like masses as are obtainable for example, by polymerizing a butadiene hydrocarbon, such as butadiene, isoprene and dimethylbutadiene alone or in admixture with one another or with other polymerizable compounds, such as, styrene, vinylnapthalene, acrylic acid esters or -nitriles, unsaturated ketones etc.

Therefore, when using in the claims the term "rubber", the same is intended to include as well natural rubber as artificial rubber-like masses like those disclosed above.

I claim:—

1. The process which comprises vulcanizing rubber in the presence of and in contact with a compound of the probable formula:—

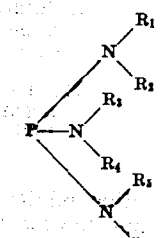

wherein

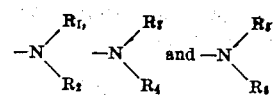

stand for radicals of secondary amines.

2. The process which comprises vulcanizing rubber in the presence of and in contact with tri-(dimethylamino)-phosphine.

3. The process which comprises vulcanizing rubber in the presence of and in contact with tri-piperidyl-phosphine.

4. The process as claimed in claim 1, in which a vulcanization accelerator containing sulfur is likewise present.

5. Vulcanization accelerators comprising a compound of the probable formula:—

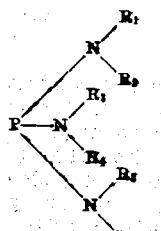

wherein

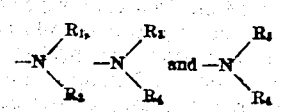

stand for radicals of secondary amines.

6. Vulcanization accelerators comprising tri-(dimethylamino)-phosphine.

7. Vulcanization accelerators comprising tri-piperidyl-phosphine.

8. The vulcanizates obtained according to the process claimed in claim 1.

HELMUTH MEIS.